United States Patent
Shuler et al.

(10) Patent No.: US 10,642,780 B2
(45) Date of Patent: May 5, 2020

(54) ATOMIC ACCESS TO OBJECT POOL OVER RDMA TRANSPORT NETWORK

(71) Applicant: Mellanox Technologies, Ltd., Yokneam (IL)

(72) Inventors: Shahaf Shuler, Karkom (IL); Noam Bloch, Bat Shlomo (IL); Gil Bloch, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 118 days.

(21) Appl. No.: 15/444,345

(22) Filed: Feb. 28, 2017

(65) Prior Publication Data

US 2017/0255590 A1    Sep. 7, 2017

Related U.S. Application Data

(60) Provisional application No. 62/304,348, filed on Mar. 7, 2016.

(51) Int. Cl.
| | |
|---|---|
| *G06F 15/173* | (2006.01) |
| *G06F 9/54* | (2006.01) |
| *G06F 13/28* | (2006.01) |
| *G06F 9/52* | (2006.01) |
| *H04L 29/08* | (2006.01) |

(52) U.S. Cl.
CPC ........ *G06F 15/17331* (2013.01); *G06F 9/526* (2013.01); *H04L 67/1097* (2013.01); *G06F 9/546* (2013.01); *G06F 13/28* (2013.01)

(58) Field of Classification Search
None
See application file for complete search history.

(56) References Cited

U.S. PATENT DOCUMENTS

| | | |
|---|---|---|
| 5,434,975 A | 7/1995 | Allen |
| 5,913,213 A | 6/1999 | Wikstrom et al. |
| 5,948,062 A | 9/1999 | Tzelnic et al. |
| 5,987,552 A | 11/1999 | Chittor et al. |
| 6,038,651 A | 3/2000 | Van Huben et al. |
| 6,044,438 A | 3/2000 | Olnowich |
| 6,092,155 A | 7/2000 | Olnowich |
| 6,108,764 A | 8/2000 | Baumgartner et al. |

(Continued)

OTHER PUBLICATIONS

"RFC 7306, Remote Direct Memory Access (RDMA) Protocol Extensions", Internet Engineering Task Force, ISSN: 2070-1721, Jun. 2014 [retrieved on Jan. 4, 2019]. Retrieved from the Internet: <URL: https://tools.ietf.org/pdf/rfc7306>. (Year: 2014).*

(Continued)

*Primary Examiner* — Kevin T Bates
*Assistant Examiner* — Dae Kim
(74) *Attorney, Agent, or Firm* — Kligler & Associates Patent Attorneys Ltd

(57) ABSTRACT

In a fabric of network elements one network element has an object pool to be accessed stored in its memory. A request for atomic access to the object pool by another network element is carried out by transmitting the request through the fabric to the one network element, performing a remote direct memory access to a designated member of the object pool, atomically executing the request, and returning a result of the execution of the request through the fabric to the other network element.

17 Claims, 4 Drawing Sheets

(56) References Cited

U.S. PATENT DOCUMENTS

| | | | |
|---|---|---|---|
| 6,154,816 A | 11/2000 | Steely et al. | |
| 6,275,907 B1 | 8/2001 | Baumgartner et al. | |
| 6,338,122 B1 | 1/2002 | Baumgartner et al. | |
| 6,490,662 B1 | 12/2002 | Pong et al. | |
| 6,523,066 B1 | 2/2003 | Montroy et al. | |
| 7,376,800 B1 | 5/2008 | Choquette | |
| 7,496,698 B2 | 2/2009 | Biran et al. | |
| 7,640,545 B2 | 12/2009 | Kuman et al. | |
| 7,688,838 B1 | 3/2010 | Aloni et al. | |
| 8,213,315 B2 | 7/2012 | Crupnicoff et al. | |
| 8,761,189 B2 | 6/2014 | Shachar et al. | |
| 9,164,702 B1 | 10/2015 | Nesbit et al. | |
| 9,563,426 B1 | 2/2017 | Bent et al. | |
| 9,699,110 B2 | 7/2017 | Goldenberg et al. | |
| 2003/0084038 A1 | 5/2003 | Balogh et al. | |
| 2004/0193734 A1* | 9/2004 | Barron | H04L 29/06 709/250 |
| 2005/0144339 A1 | 6/2005 | Wagh et al. | |
| 2006/0123156 A1* | 6/2006 | Moir | G06F 9/466 710/33 |
| 2007/0079075 A1 | 4/2007 | Collier et al. | |
| 2009/0113443 A1 | 4/2009 | Heller, Jr. et al. | |
| 2010/0017572 A1 | 1/2010 | Koka et al. | |
| 2010/0106948 A1* | 4/2010 | Bellows | G06F 13/28 712/225 |
| 2010/0191711 A1 | 7/2010 | Carey et al. | |
| 2010/0313208 A1* | 12/2010 | Zarzycki | G06F 9/52 719/315 |
| 2011/0099335 A1 | 4/2011 | Scott et al. | |
| 2011/0239043 A1 | 9/2011 | Vedder et al. | |
| 2012/0023295 A1 | 1/2012 | Nemawarkar | |
| 2012/0179877 A1 | 7/2012 | Shriraman et al. | |
| 2012/0310987 A1 | 12/2012 | Dragojevic et al. | |
| 2012/0311213 A1 | 12/2012 | Bender et al. | |
| 2013/0019000 A1 | 1/2013 | Markus et al. | |
| 2013/0290473 A1 | 10/2013 | Chen et al. | |
| 2014/0025884 A1 | 1/2014 | Stark et al. | |
| 2014/0040551 A1 | 2/2014 | Blainey et al. | |
| 2014/0040557 A1 | 2/2014 | Frey et al. | |
| 2014/0047060 A1 | 2/2014 | Chen et al. | |
| 2014/0047205 A1 | 2/2014 | Frey et al. | |
| 2014/0068201 A1 | 3/2014 | Fromm | |
| 2014/0101390 A1 | 4/2014 | Sohi et al. | |
| 2014/0181823 A1 | 6/2014 | Manula et al. | |
| 2015/0052313 A1 | 2/2015 | Ghai et al. | |
| 2015/0052315 A1 | 2/2015 | Ghai et al. | |
| 2015/0095600 A1 | 4/2015 | Bahnsen et al. | |
| 2015/0100749 A1 | 4/2015 | Koker et al. | |
| 2015/0253997 A1 | 9/2015 | Kessler et al. | |
| 2015/0254104 A1 | 9/2015 | Kessler et al. | |
| 2015/0254182 A1 | 9/2015 | Asher et al. | |
| 2015/0254183 A1 | 9/2015 | Akkawi et al. | |
| 2015/0254207 A1 | 9/2015 | Kessler | |
| 2015/0269116 A1 | 9/2015 | Raikin et al. | |
| 2016/0043965 A1 | 2/2016 | Raikin et al. | |

OTHER PUBLICATIONS

Dragojevic et al. "FaRM: Fast Remote Memory", 11th USENIX Symposium on Networked Systems Design and Implementation, Apr. 4, 2014 [retrieved on Jan. 4, 2019]. Retrieved from the Internet: <URL: https://www.usenix.org/system/files/conference/nsdi14/nsdi14-paper-dragojevic.pdf>. (Year: 2014).*

U.S. Appl. No. 14/665,043 office action dated Aug. 25, 2017.

European Application # 171597461 Search Report dated Jul. 25, 2017.

Hammond et al., "Transactional Memory Coherence and Consistency", Proceedings of the 31st annual international symposium on Computer architecture, vol. 32, issue 2, 12 pages, Mar. 2004.

InfiniBand Architecture Specification, vol. 1, Release 1.2.1, 1727 pages, 2007.

Supplement to InfiniBand Architecture Specification vol. 1.2.1, Annex A14: "Extended Reliable Connected (XRC) Transport Service", Revision 1.0, 43 pages, Mar. 2, 2009.

Raman, A, "Transactional Memory-Implementation", Lecture 1, Princeton University, 63 pages, Fall 2010.

PCI Express® Base Specification, Revision 3.1 , 1073 pages, Mar. 2014.

Mellanox Technologies, Inc. "Mellanox IB-Verbs API (VAPI)", Mellanox Software Programmer's Interface for InfiniBand Verbs, 78 pages, year 2001.

U.S. Appl. No. 15/659,876 office action dated Apr. 24, 2019.

CN Application # 2017101219749 office action dated Jun. 19, 2019.

* cited by examiner

ATOMIC ACCESS TO OBJECT POOL OVER RDMA TRANSPORT NETWORK

CROSS-REFERENCE TO RELATED APPLICATIONS

This Application claims the benefit of U.S. Provisional Application No. 62/304,348, filed 7 Mar. 2016, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to network arrangements and protocols for real-time communications. More particularly, this invention relates to interconnection and transfer of information or other signals between, memories, input/output devices or central processing units by remote direct memory access.

2. Description of the Related Art

The meanings of certain acronyms and abbreviations used herein are given in Table 1.

TABLE 1

Acronyms and Abbreviations

| | |
|---|---|
| CAS | Compare-and-swap |
| FAAD | Fetch and Add |
| FIFO | First In First Out |
| IB | InfiniBand |
| iWARP | Internet Wide Area RDMA Protocol |
| LIFO | Last In Last Out |
| MPI | Message Passing Interface |
| NIC | Network Interface Card |
| QP | Queue pair |
| RDMA | Remote Direct Memory Access |
| RoCE | RDMA over Converged Ethernet |
| WQE | Work Queue Element |

RDMA is a direct memory access from the memory of one computer into that of another without involving either one's operating system. Common RDMA implementations include RDMA over converged Ethernet (RoCE), InfiniBand and iWARP. RDMA supports a limited set of atomic operations:

(1) Fetch-and-add (FAAD). This atomically modifies the contents of a memory location: set x to x+a, where x is a memory location and a is some value.

Data in the location prior to the add operation is returned to the requestor. When this operation is executed in a concurrent environment, no other process ever sees an intermediate result.

(2) Compare-and-swap (CAS). This operation reads remote data, compares it with a compare value, and if they are equal, swaps the remote data with given swap data. Atomicity of the CAS operation assures that the new value is calculated based on up-to-date information; if the remote data had been updated by another thread in the meantime, the substitution would fail. The result of the operation should indicate whether the substitution succeeded or failed.

RDMA is often mediated by a message passing protocol. Message Passing Interface (MPI) is a communication protocol that is widely used for exchange of messages among processes in high-performance computing systems. Such systems typically use RDMA transport. With MPI, a user can define a group of processes, called a communicator. Each communicator has a unique communicator identifier (an integer) with respect to all other communicators on the system.

In one example, U.S. Patent Application Publication No. 2010/0106948 proposes management of a shared message queue that involves RDMA access to the queue. Processing devices cooperate to process the queue data. When one processing device successfully accesses queue data, the queue data is locked for the exclusive use of that processing device. The processing device is able to process the data and return processed queue data.

SUMMARY OF THE INVENTION

Embodiments of the present invention extend the currently supported atomic operations over RDMA transport by enabling atomic access to a generic object pool. The object pool can be accessed through a network by network interface controllers in a fully offloaded way, i.e., without any involvement by a host processor. Atomicity of the operation on the responder node is assured even in the presence of multiple agents accessing the same data structure. The object pool can contain a series of objects of any size or type, and the data can have any structure.

There is provided according to embodiments of the invention a method of communication, which is carried out in a fabric of network elements that includes a first network element and a second network element. The second network element has an object pool to be accessed stored in its memory. The method is carried out by initiating a request in the first network element for a remote direct memory access to the memory of the second network element, transmitting the request through the fabric to the second network element, accessing a designated member of the object pool by atomically executing the request, and returning a result of the execution of the request through the fabric to the first network element.

According to one aspect of the method, accessing the pool is performed by an atomic get operation that retrieves one of the objects of the pool.

According to yet another aspect of the method, the pool is arranged as a first-in-first-out queue, and returning a result includes retrieving the next object of the queue. The access may include dequeuing the next object.

According to still another aspect of the method, the pool is arranged as a last-in-first-out queue, and returning a result includes retrieving the next object of the queue. The access may include dequeuing the next object.

According to a further aspect of the method, accessing the pool is performed by adding a new object to the pool in an atomic push operation.

According to an additional aspect of the method, the pool is arranged as a first-in-first-out queue and adding a new object includes enqueuing the new object.

According to still another aspect of the method, the pool is arranged as a last-in-first-out queue and adding a new object includes enqueuing the new object.

According to another aspect of the method, atomically executing the request is controlled independently by a device connected to a host computer.

There is further provided according to embodiments of the invention a fabric of network elements including a first network element and a second network element. The second network element has a memory and a pool of objects stored in the memory. The first network element is operative for initiating a request for a remote direct memory access to the memory of the second network element, transmitting the request through the fabric to the second network element, accessing the pool by atomically executing the request, and returning a result of the execution of the request through the fabric to the first network element.

The first network element can include a network interface card. An atomic controller for controlling execution of atomic operations can be located in the network interface card.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
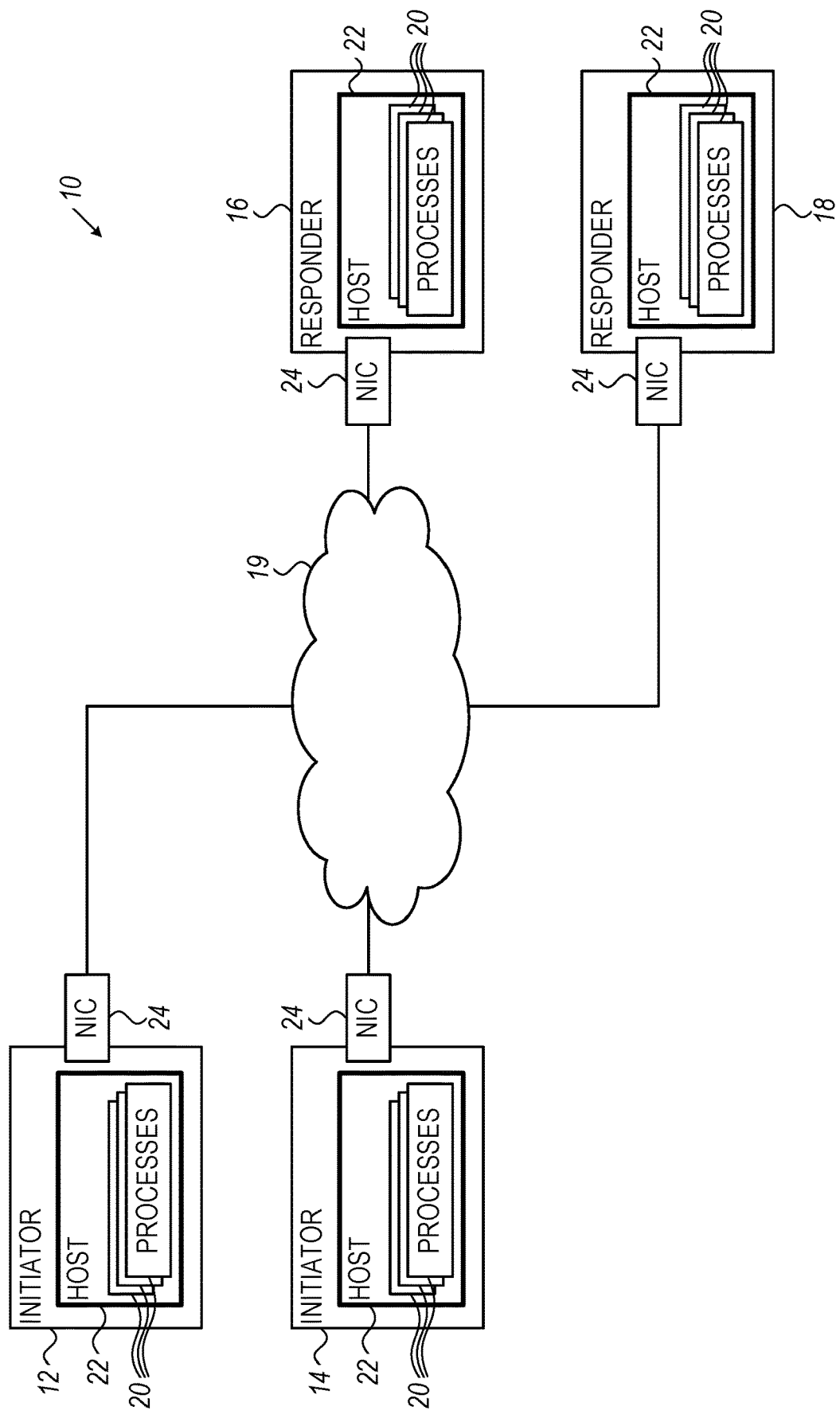
FIG. 1 schematically illustrates a computer system in which the principles of the invention are applied.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

A "switch fabric" or "fabric" refers to a network topology in in which network nodes interconnect via one or more network switches (such as crossbar switches), typically through many ports. The interconnections are configurable such that data is transmitted from one node to another node via designated ports. A common application for a switch fabric is a high performance backplane.

An "object pool" is a group of reachable data objects residing in a memory. When the group is ordered the "next object" in the pool is the object next to be accessed when the objects are processed in order.

An "atomic operation" acting on shared memory appears to complete in a single step relative to other processes or threads. When an atomic store is performed on a shared variable, no other thread or process can observe the modification half-complete. When an atomic load is performed on a shared variable, it reads the entire value as it appeared at a single moment in time. When an atomic modify operation is performed, no other thread or process can observe intermediate values.

Overview

Embodiments of the invention provide access to an object pool using an RDMA transport network. An object pool is a generic data structure used to organize data in a particular way. Common ways to organize data in the object pool include FIFO, LIFO and list:

List—number of objects in a specific order. Different objects are typically accessed via an index.

FIFO—A method for organizing and manipulating an object buffer. In FIFO the oldest object in the buffer is processed first.

LIFO—In LIFO the most recently object placed in a buffer (or top of a stack) is processed first.

An object in this context is a set of bits and can be at any size.

Fetch-and-add and compare-and-swap provide a limited functionally for RDMA applications. Application writers use them to implement semaphores or distributed access to arrays. However, these operations cannot be directly used to implement more complex algorithms, such as selecting the next integer from a pool of integers. This kind of selection can be used in MPI communicator creation to give the next communicator identifier in a fully offloaded way. In communicator creation, all of the communicator processes receive the next integer from an integer pool and use it as a communicator identifier. When a communicator is destroyed, the communicator identifier is returned to the integer pool.

In another example, an application prepares a global pool of data segments for use by remote processes in a fabric. Each process needing data obtains its next data segment from the global pool. When finished with one data segment, it can again access the global pool to obtain the next one. Conventionally, this is performed by the combination of a fetch-and-add operation followed by an RDMA read operation (RDMA_READ). This involves two round trips through the fabric, using the object pool. The requesting process then must process the atomic response, and create the RDMA_READ operation. As a result there are two dependent operations instead of one atomic operation.

System Architecture

Reference is now made to FIG. 1, which schematically illustrates an exemplary computer system 10, in which the principles of the invention are applied. The system 10 is configured for use in an InfiniBand fabric, but may be adapted for other networks by those skilled in the art. System 10 comprises nodes 12, 14, 16, 18, which are interconnected by a packet network 19, such as an Infini- Band switch fabric. In the pictured embodiment, nodes 12 and 14 are initiator nodes, while nodes 16 and 18 are responder nodes, but typically any given node may be both an initiator and a responder concurrently. In this example, there is an initiator process from a group of processes 20 executing on a host 22. Node 12 or node 14, functioning as the initiator, submits a request for a resource to NIC 24 (e.g., an InfiniBand host channel adapter) to send a message to a target process from among a group of processes 20 executing on the host 22 of a target (responder) node 16, 18. Upon receiving the work request, The NIC of the initiator node sends a packet to the NIC of the responder node to establish a connection. As noted above, any reliable protocol is suitable for the connection.

Figure 2:
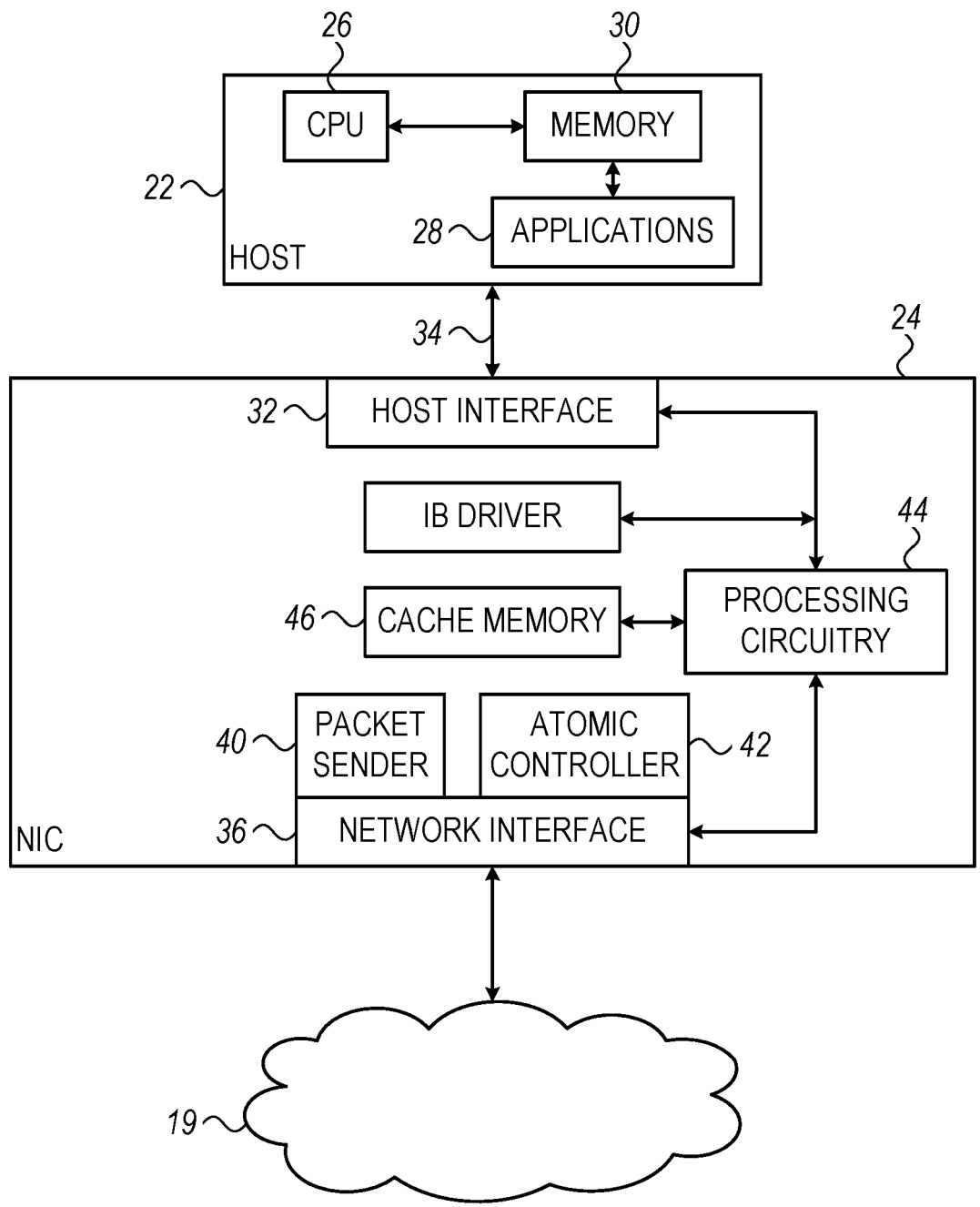
FIG. 2 is a block diagram of a computing node in the system shown in FIG. 1.

Reference is now made to FIG. 2, which is a block diagram of a computing node, in accordance with an embodiment of the invention that schematically illustrates functional components of nodes 12, 14, 16, 18, and particularly the elements of NIC 24 that are involved in providing transport service. While a NIC is shown in FIG. 2, the principles of the invention are applicable to other network elements having processing circuitry. Host 22 comprises a central processing unit, CPU 26, which runs processes 20 (FIG. 1)and host applications 28, and has a host memory 30 that is accessible to the CPU 26. The memory 30 is typically used to hold process and system data and context information used by NIC 24. NIC 24 comprises a host interface 32 for communicating with host 22 via a bus 34 and a network interface 36 for transmitting and receiving packets to and from network 19. The network interface 36 includes packet sender 40 and an atomic controller 42 The functions described below are carried out by processing circuitry 44 cooperative with a suitable memory cache 46, the packet sender 40 and atomic controller 42.

Atomic Operations on Object Pool

Embodiments of the invention extend the RDMA atomic fetch-and-add and compare-and-swap operations by enabling atomic access to a generic object pool. The atomic access operations over RDMA transport are completely offloaded, i.e., they do not require software involvement of a host processor or by the host CPU. Rather, they are accomplished in an add-on device, such as an NIC that is linked to the host. The object pool can contain objects at any size or type, and the data can have any structure. Atomicity of the operation on a responder node of a network is assured in the presence of multiple agents or processes accessing the same data structure in the object pool. The inventive embodiments are indifferent to the organization of the object pool. For example, the object pool could be organized as a FIFO, LIFO or list. The object pool location can be in any network element, e.g., host memory, an NIC or in a switch.

Commands used to handle the object pool in accordance with an embodiment of the invention include, for example atomic-get and atomic-push operations, as well as other actions such as accessing the top of a queue without dequeuing and actions accessing a particular element in the queue. An atomic-get operation results in the "next object" in the pool being returned to the requester. The next object depends on the organization of the object pool. For example, if the object pool is an ordered list of objects {a1, a2, a3 . . . }, and the object a1 was the last object accessed prior to an atomic-get operation that is about to be executed on that object pool, then the object a2 is the next object and will be returned in the atomic-get operation. The next object for FIFO and LIFO object pools will be understood likewise and may, but not necessarily, involve dequeuing the next object.

A list of exemplary atomic operations that may be accomplished by application of the principles of the invention follows:
Push—enqueue next element.
Pop—dequeue next element.
Top—read first element.
Read (i)—read element in place i.
Count—get number of elements in the pool.
Clear—remove all elements from pool.
Delete(i)—delete the i'th element.

Figure 3:
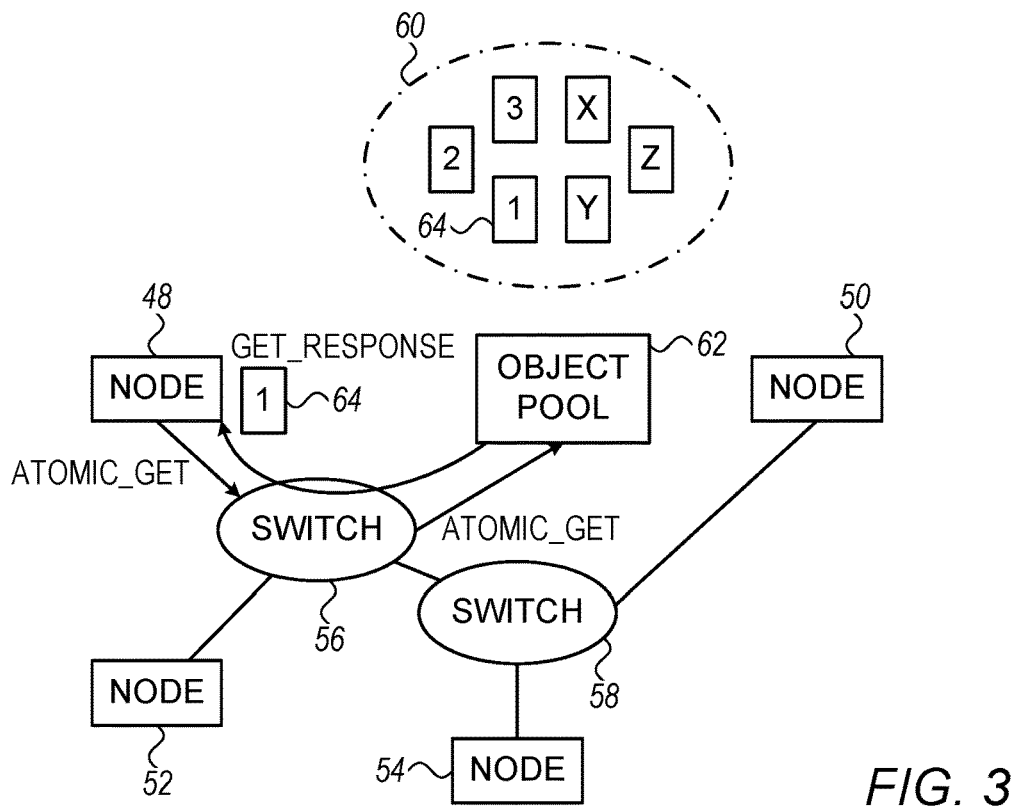
FIG. 3 is a diagram illustrating on atomic-get operation in accordance with an embodiment of the invention.

Reference is now made to FIG. 3, which is a diagram illustrating on atomic-get operation from an object pool located in a network in accordance with an embodiment of the invention. The network includes nodes 48, 50, 52, 54 connected to switches 56, 58. An object pool 60 is represented by block 62. Block 62 represents the network element containing the object pool, which in this example is a FIFO. Indeed, the object pool may be distributed among multiple nodes, to which the atomic operation is directed concurrently. In this case the requester maintains return information from each of the targets to verify conjoint atomicity. Moreover, the responder must know the location of the object pool. Usually it will be on the same node as the responder. However, in a more complex case the object pool can be on other nodes, which the responder must be aware of, as it needs to initiate remote operation to those remote object pools. In any case, the next object of the object pool 60 is currently object 64. Node 48 directs an atomic-get operation to object pool 60 by a message to switch 56, for example using MPI and conventional routing and switching techniques. The message is relayed to the network element location corresponding to block 62. Object 64, the head of the FIFO, is fetched from the object pool 60 and returned to node 48 via switch 56. Atomicity of the sequence is assured by an atomic controller, which is described below.

Figure 4:
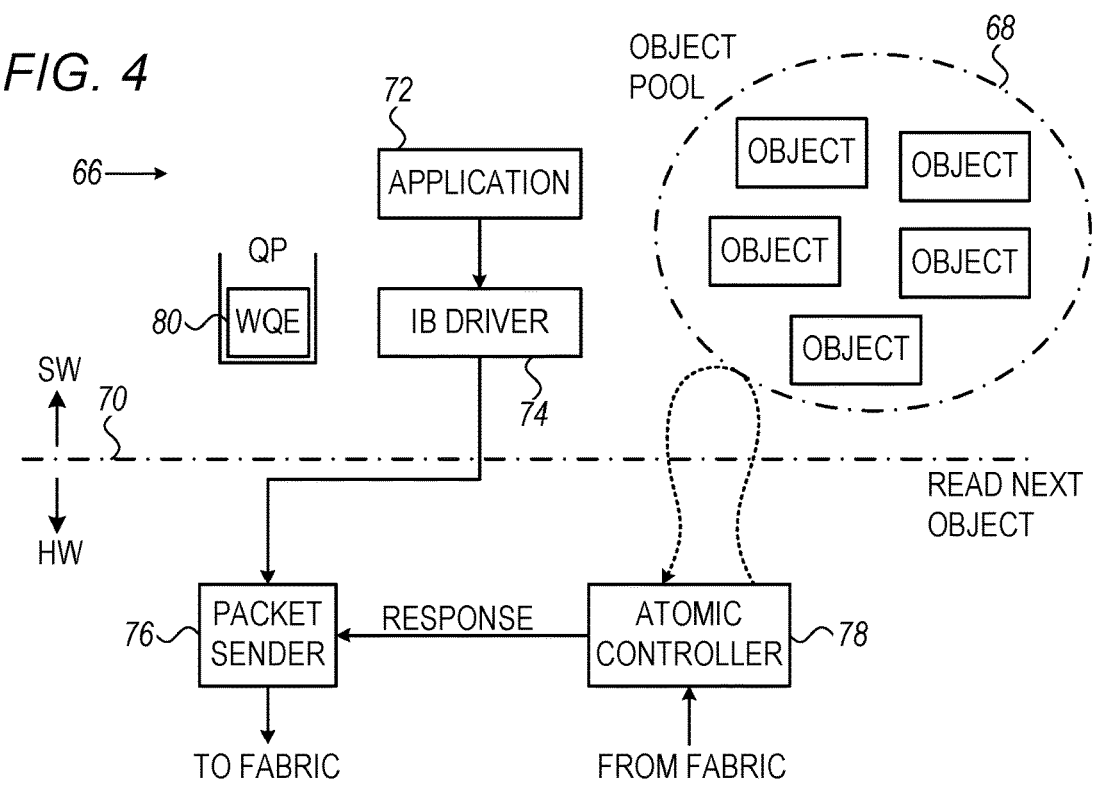
FIG. 4 is a block diagram of an arrangement for atomic access to an object pool in accordance with an embodiment of the invention.

Reference is now made to FIG. 4, which is a block diagram of an arrangement 66 for atomic access to an object pool 68 in accordance with an embodiment of the invention. Elements above a broken line 70 are typically located in a host computer, while elements below the line 70 are implemented in a network element, such as a network interface card. Although the arrangement 66 is shown as comprising a number of separate functional blocks, these blocks are not necessarily separate physical entities, but rather represent different computing tasks or data objects stored in a memory that is accessible to a processor. These tasks may be carried out in software running on a single processor, or on multiple processors. The software may be embodied on any of a variety of known non-transitory media for use with a computer system, such as a diskette, or hard drive, or CD-ROM. The code may be distributed on such media, or may be distributed to the arrangement 66 from the memory or storage of another computer system (not shown) over a network. Alternatively or additionally, the arrangement 66 may comprise a digital signal processor, field programmable gate array or hard-wired logic. The arrangement 66 is described with respect to an InfiniBand implementation, but can be applied to other network communications standards, mutatis mutandis.

An application 72 comprises software code that uses a hardware driver 74 in order to access a remote or local memory object pool, such as the object pool 68, and to obtain the next object in the pool. When the object pool is unorganized, the atomic operations may result in access of a random element. In one embodiment, the driver 74 translates InfiniBand verbs into hardware-specific commands. An exemplary verb definition in an InfiniBand embodiment that implements an atomic operation directed to an object pool according to the principles of the invention is given in Listing 1.

```
Ibv_exp_obj_pool_access(ibv_qp*qp, ibv_obj_pool
    pool, ibv_obj_pool_op operation, void*data)         Listing 1
```

The parameters in Listing 1 are as follows:

Qp: the requester queue pair (QP) on which the operation is performed. The transport of the Qp must be reliable.

Pool: remote object pool the requester intends to access.

Op: operation to be performed on the object pool, e.g., pop/push/top.

Data: specific fields according to operations. For example, a push operation requires an object pointer that needs to be pushed. A pop operation requires a memory pointer to store the pop response.

InfiniBand verbs are described in the document Mellanox IB-Verbs API (VAPI), Mellanox Software Programmer's Interface for InfiniBand Verbs, (2001), available on the Internet or from Mellanox Technologies, Inc., 2900 Stender Way, Santa Clara, Calif. 95054, which is herein incorporated by reference. The driver 74 controls a packet sender 76, which is responsible to transmit data packets into a fabric. An atomic controller 78 handles atomic operations via the fabric, and is responsible for assuring atomicity of the operation. In addition, the atomic controller 78 passes information in response to the atomic operation to the packet sender 76 for relay to the requester of the operation.

In an atomic-get operation, the application 72 calls the corresponding function or verb, such as a suitably modified version of the standard verb ibv_post_sent, which is translated by the driver 74 into a command for an NIC or other network element. In the InfiniBand implementation, the command is a work queue element 80 (WQE). The work queue element 80 is communicated to the packet sender 76 and thence to an object pool, e.g., object pool 68, in a remote target (not shown) via the fabric. Alternatively the work queue element 80 could access a local object pool, in which case the packet sender 76 executes a loopback operation.

At the remote target the atomic controller 78 controls the timing of the execution of the atomic-get, coordinating the execution with regard to other atomic operations that are being performed on the object pool 68. When the atomic controller 78 determines that the atomic-get can be executed, the atomic controller 78 reads the next object from the object pool 68 using RDMA, according to the particular organization of the objects in the pool, as described above. When the next object is fetched, the atomic controller 78 passes it to the packet sender 76 for relay to the requester, which in this example is the application 72.

The sequence for an atomic-push operation is similar to the atomic-get, except that a new element is inserted into the object pool 68. In the case of FIFO and LIFO queues, the atomic push operation enqueues a new object. In another example, the atomic push operation may insert an element into a linked list. The atomic controller 78 relays the result of the atomic-push operation to the requester, e.g., the status of the object pool 68, which may be empty, full, or somewhere in between.

Figure 5:
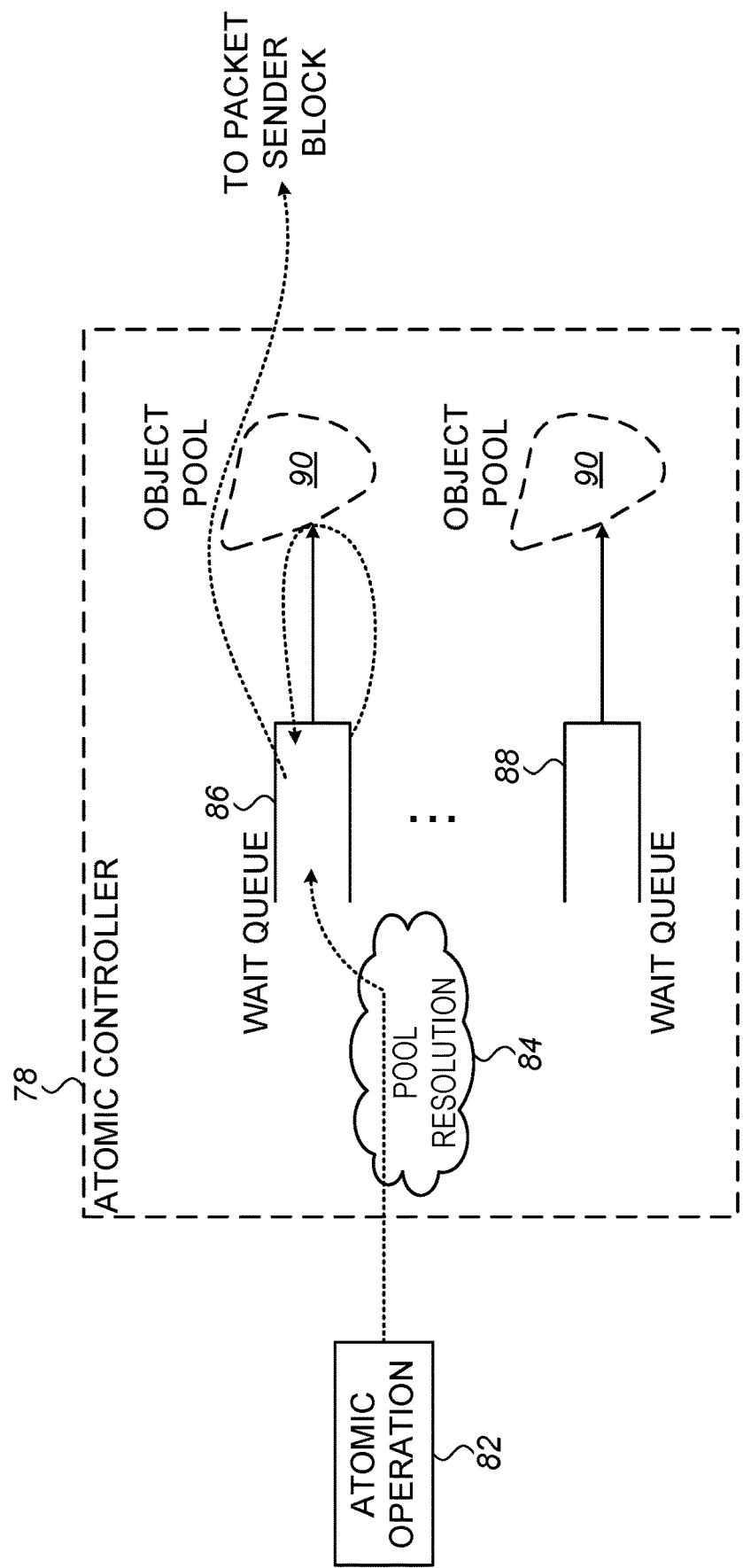
FIG. 5 is a functional illustration of the operation of the atomic controller in accordance with an embodiment of the invention.

Reference is now made to FIG. 5, which is a functional illustration of the operation of the atomic controller 78 (FIG. 4), in accordance with an embodiment of the invention. The input to the atomic controller 78 is a request to perform an atomic operation 82, which may be conveyed as a message using any suitable RDMA protocol. When the message is received in the atomic controller 78, the object pool to be accessed is resolved in pool resolution block 84 and the request placed in a wait queue 86 for the particular object pool. Wait queue 86 is a member of a set of wait queues, represented by another wait queue 88. Wait queues 86, 88 are allocated dynamically and associated with respective object pools. The appropriate wait queue is selected according to fields in the request for the atomic operation 82.

The request for the atomic operation 82 waits in the wait queue 86 for its turn to be served. An atomic operation can be served if there is no other operation ahead in the queue that is directed to the same area of the object pool. In other words, different atomic operations directed to disjoint areas of the object pool can execute concurrently, because none of the different operations influences the outcomes of the others. The required atomic ordering is enforced by logic in the atomic controller 78 that controls the wait queues 86, 88.

When the request for the atomic operation 82 reaches the head of the wait queue 86, it can operate on associated object pool 90. A single atomic operation may involve multiple writes or reads in the object pool 90 using RDMA, depending on the characteristics of the object pool 90.

When the atomic operation completes, it is removed from the wait queue 86. The atomic controller 78 creates a send descriptor for the result as appropriate to the particular atomic operation. In case the wait queue 86 becomes empty, it is freed and can be reallocated for a subsequent atomic operation. The reallocated work queue may relate to the object pool 90 or a different object pool.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication comprising the steps of:
   in a fabric of network elements including a first network element and a plurality of second network elements, the second network elements each having a memory and respective portions of a pool of objects in the memory;
   initiating a request in the first network element for concurrent remote direct memory accesses to the pool of objects in the second network elements;
   transmitting the request through the fabric to the second network elements;
   accessing a designated member of the pool of objects by atomically executing the request;
   returning respective reports of the execution of the request through the fabric from each of the second network elements to the first network element; and
   verifying conjoint atomicity of the execution of the request from the respective reports,
   wherein the pool of objects is arranged as a queue and the designated member is a next object of the queue, and accessing comprises at least one of dequeuing and enqueueing the next object.

2. The method according to claim 1, wherein accessing comprises an atomic get operation that retrieves one of the objects of the pool.

3. The method according to claim 2, wherein the pool is arranged as a first-in-first-out queue and returning respective reports comprises retrieving the next object.

4. The method according to claim 2, wherein the pool is arranged as a last-in-first-out queue and returning respective reports comprises retrieving the next object.

5. The method according to claim 1, wherein atomically executing the request is controlled independently by a device connected to a host computer.

6. The method according to claim 1, wherein accessing comprises enqueueing a new object to the pool in an atomic push operation.

7. The method according to claim 6, wherein the pool is arranged as a first-in-first-out queue.

8. The method according to claim 6, wherein the pool is arranged as a last-in-first-out queue.

9. An apparatus of communication comprising:
a fabric of network elements including a first network element and a plurality of second network elements, the second network elements each having a memory and storing respective portions of a pool of objects in the memory, the first network element operative for:
initiating a request in the first network element for concurrent remote direct memory accesses to the pool of objects in the second network elements;
transmitting the request through the fabric to the second network elements;
accessing a designated member of the pool of objects by atomically executing the request;
returning respective reports of the execution of the request through the fabric from each of the second network elements to the first network element; and
verifying conjoint atomicity of the execution of the request from the respective reports,
wherein the pool of objects is arranged as a queue and the designated member is a next object of the queue, and accessing comprises at least one of dequeuing and enqueuing the next object.

10. The apparatus according to claim 9, wherein accessing comprises an atomic get operation that retrieves one of the objects of the pool.

11. The apparatus according to claim 10, wherein the pool is arranged as a first-in-first-out queue, and returning respective reports comprises retrieving the next object.

12. The apparatus according to claim 10, wherein the pool is arranged as a last-in-first-out queue, and returning respective reports comprises retrieving the next object.

13. The apparatus according to claim 9, wherein accessing comprises enqueuing the next object in an atomic push operation.

14. The apparatus according to claim 13, wherein the pool is arranged as a first-in-first-out queue, further comprising adding a new object by enqueuing the next object.

15. The apparatus according to claim 13, wherein the pool is arranged as a last-in-first-out queue, further comprising adding a new object by enqueuing the next object.

16. The apparatus according to claim 9, wherein the network element is a network interface card.

17. The apparatus according to claim 16, further comprising an atomic controller in the network interface card for independently controlling executing the request.

* * * * *